United States Patent
Zörb-Schliefer

(10) Patent No.: US 9,599,478 B2
(45) Date of Patent: Mar. 21, 2017

(54) POSITION INPUT INTO A NAVIGATION DEVICE OF A VEHICLE

(71) Applicant: Audi AG, Ingolstadt (DE)

(72) Inventor: Arne Zörb-Schliefer, Pettstadt (DE)

(73) Assignee: AUDI AG, Ingolstadt (DE)

( * ) Notice: Subject to any disclaimer, the term of this patent is extended or adjusted under 35 U.S.C. 154(b) by 23 days.

(21) Appl. No.: 14/896,620

(22) PCT Filed: Jun. 21, 2014

(86) PCT No.: PCT/EP2014/001692
§ 371 (c)(1),
(2) Date: Dec. 7, 2015

(87) PCT Pub. No.: WO2015/007363
PCT Pub. Date: Jan. 22, 2015

(65) Prior Publication Data
US 2016/0131488 A1     May 12, 2016

(30) Foreign Application Priority Data

Jul. 15, 2013   (DE) ........................ 10 2013 011 823

(51) Int. Cl.
*G01C 21/26*   (2006.01)
*G06F 3/0481*  (2013.01)
(Continued)

(52) U.S. Cl.
CPC ............ *G01C 21/26* (2013.01); *G01C 21/362* (2013.01); *G06F 3/04812* (2013.01); *G06F 3/04842* (2013.01); *G06F 3/04847* (2013.01)

(58) Field of Classification Search
CPC . G01C 21/26; G01C 21/362; G06F 3/04812; G06F 3/04842; G06F 3/04847

USPC .................................................. 701/400, 454
See application file for complete search history.

(56) References Cited

U.S. PATENT DOCUMENTS 6,182,006 B1 *  1/2001  Meek .................. G01C 21/362
                                                    340/988
6,505,121 B1 *  1/2003  Russell ................ G01C 21/26
                                                    340/588
(Continued)

FOREIGN PATENT DOCUMENTS

DE     199 27 647    12/2000
DE     102 60 415    7/2004
(Continued)

OTHER PUBLICATIONS

International Search Report issued by the European Patent Office in International Application PCT/EP2014/001692 on Oct. 17, 2014.

*Primary Examiner* — Tyler J Lee
(74) *Attorney, Agent, or Firm* — Henry M. Feiereisen LLC.

(57) ABSTRACT

A method for inputting position data into a navigation device of a vehicle, includes the steps: —displaying (10) positions on a graphical output unit of a mobile radio terminal device; —marking (12) one of the displayed positions on the output unit by a mark; —displaying (14) a graphical representation of a symbol for a vehicle by the output unit, to which vehicle the mobile radio terminal device makes vehicle-specific communication link data available; —shifting (16) the mark to the symbol of the vehicle or the symbol of the vehicle to the mark on the output unit; and —transmitting (18) position data identifying the marked position to the navigation device of the vehicle.

8 Claims, 1 Drawing Sheet

(51) Int. Cl.
*G06F 3/0484* (2013.01)
*G01C 21/36* (2006.01)

(56) References Cited

U.S. PATENT DOCUMENTS

| | | | | |
|---|---|---|---|---|
| 6,807,484 B2* | 10/2004 | Inoue | ............... | G01C 21/26 |
| | | | | 340/995.1 |
| 7,552,009 B2* | 6/2009 | Nelson | ............... | G01C 21/362 |
| | | | | 701/36 |
| 2003/0060976 A1* | 3/2003 | Sato | ............... | G01C 21/3438 |
| | | | | 701/533 |
| 2005/0149260 A1 | 7/2005 | Bae | | |
| 2009/0005070 A1* | 1/2009 | Forstall | ............... | G01C 21/12 |
| | | | | 455/456.1 |
| 2009/0119005 A1* | 5/2009 | Ishibashi | ............... | G01C 21/343 |
| | | | | 701/533 |
| 2009/0164110 A1 | 6/2009 | Basir | | |
| 2010/0125405 A1 | 5/2010 | Chae et al. | | |
| 2012/0078497 A1* | 3/2012 | Burke, Jr. | ............... | G08G 1/0104 |
| | | | | 701/300 |
| 2013/0132887 A1 | 5/2013 | Amin et al. | | |
| 2013/0166203 A1 | 6/2013 | Ukai | | |
| 2014/0256258 A1* | 9/2014 | DeLuca | ............... | H04W 4/008 |
| | | | | 455/41.2 |

FOREIGN PATENT DOCUMENTS

| | | |
|---|---|---|
| DE | 102009056203 | 6/2011 |
| DE | 102010002740 | 9/2011 |
| DE | 102010054576 | 6/2012 |
| DE | 102010056411 | 6/2012 |
| DE | 102012012793 | 3/2013 |
| EP | 1 403 617 | 3/2004 |
| JP | 2004078888 | 3/2004 |

\* cited by examiner

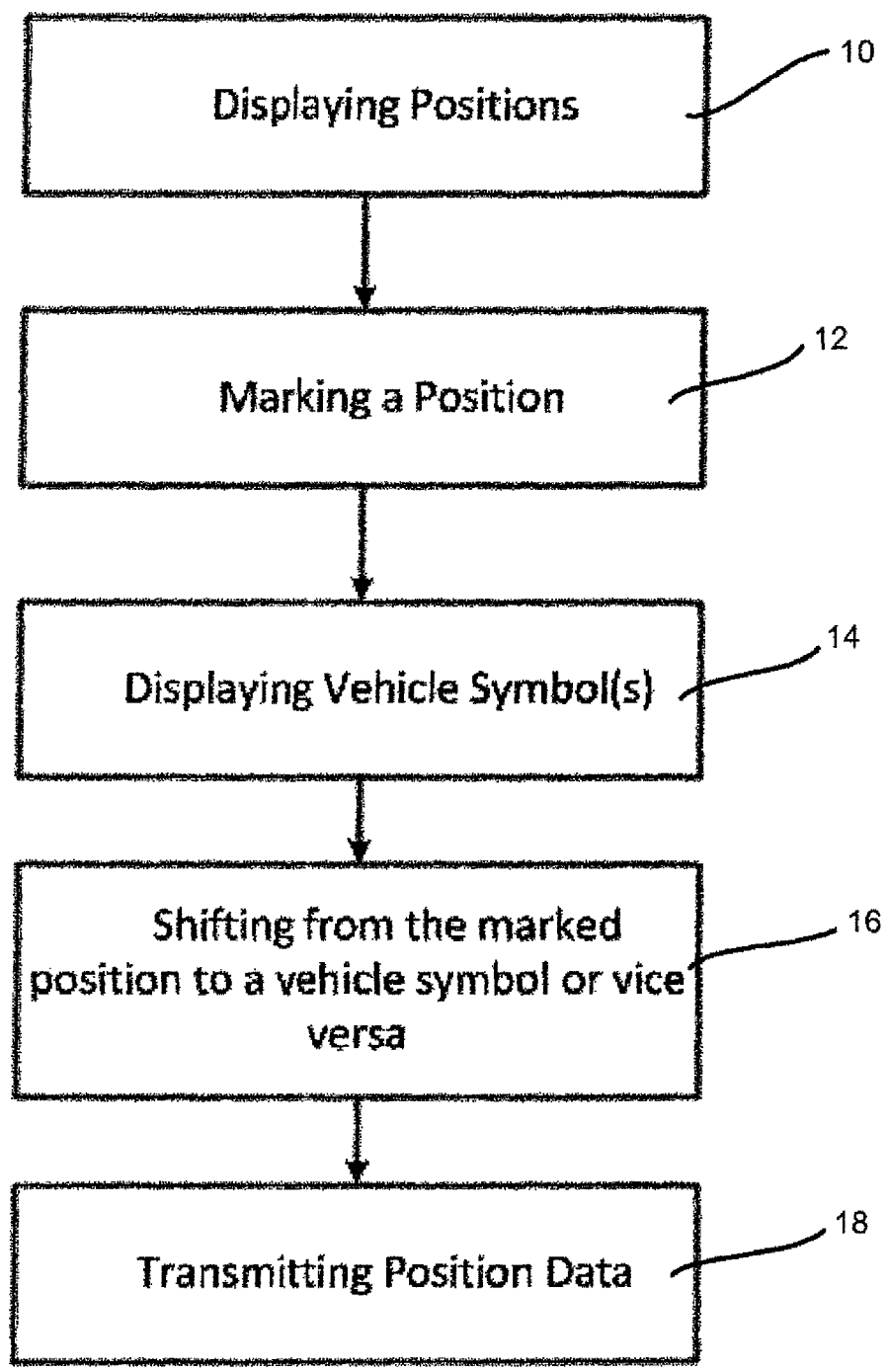

POSITION INPUT INTO A NAVIGATION DEVICE OF A VEHICLE

CROSS-REFERENCES TO RELATED APPLICATIONS

This application is the U.S. National Stage of International Application No. PCT/EP2014/001692, filed Jun. 21, 2014, which designated the United States and has been published as International Publication No. WO 2015/007363 and which claims the priority of German Patent Application, Serial No. 10 2013 011 823.9, filed Jul. 15, 2013, pursuant to 35 U.S.C. 119(a)-(d).

BACKGROUND OF THE INVENTION

The present invention relates to a method for inputting position data in a navigation device of a vehicle as well as a mobile radio end device which is designed for the input of position data in a navigation device of a vehicle.

To use a navigation device of a vehicle as intended, it is normally required to enter at least one target position manually. This is time-consuming and error-prone, particularly when typing errors lead to wrong navigation destinations.

From U.S. 2005/0149260 A1, it is already known to place a portable device in communication link to a navigation device of the vehicle. The portable device has access to location data that characterize a geographic location. The location data is then transmitted from the portable device to the navigation device of the vehicle. After the transmission, a driver of the vehicle interacts with the navigation device and looks for the location data transmitted by the mobile radio end device. The navigation device displays the corresponding location data to the driver.

Although this disclosure allows that the driver does not need to enter the navigation destination manually at the navigation device of the vehicle, still a corresponding provision of entered positions by the portable device is required. The driver thus has to make an entry in the portable device instead of an entry in the navigation device. In this way, the inputting friendliness or ergonomics cannot be improved.

SUMMARY OF THE INVENTION

It is thus the object of the invention to realize an improvement with regard to the input of a position in a navigation device of a vehicle.

As a solution, the invention proposes a method for inputting a position in a navigation device of a vehicle, with the steps of:

Displaying (10) positions on a graphical output unit of a mobile radio end device, Marking (12) one of the displayed positions of the output unit by a mark, Displaying (14) a graphical representation of a symbol for a vehicle by the output unit, for which the mobile radio end device keeps vehicle-specific communication link data available, Shifting (16) the mark to the symbol of the vehicle or the symbol of the vehicle to the mark on the output unit, and Transmitting (18) position data identifying the marked position to the navigation device of the vehicle.

With the invention, it is possible to significantly simplify the input of position data characterizing the positions in the navigation device of the vehicle. The user no longer needs to input in the form of manual typing, but he can select completely available position data by marking and transmit them to the navigation device of the vehicle. Typing errors or the like can be largely avoided and the time required for the input can be significantly reduced.

The mobile radio end device can be a mobile phone, a smart phone, a PDA or the like, that allows communication over a cellular network in accordance with a mobile radio standard such as GSM, UMTS, LTE or the like. The display of positions can be done via alphanumeric characters or in graphical form, for example by characters identifying the position or the like.

The marking is an input, preferably of the user or the driver. This can be done manually, by voice or the like. The user marks the position data on the output unit, for example by an input via an input unit such as a keyboard or the like, by moving, for example, a cursor to the position data being displayed on an input unit so that a corresponding entry is made. Thereafter, a graphical representation of a vehicle, for example in the form of a symbol is displayed by means of the output unit, for which the vehicle keeps the mobile radio end device vehicle-specific communication link data available. The symbol is associated with the vehicle and in particular individually or identifying for the vehicle. The vehicle may be a vehicle of the user who made the mark. However, it can also be other vehicles that are positioned away from the mobile radio end device. In addition, there is, of course, the possibility that in more than one vehicle more than one vehicle symbol is displayed, preferably for each vehicle its own symbol identifying the vehicle, with the mobile radio end device keeping vehicle-specific communication link data available for each of the vehicles displayed. The vehicle-specific communication link data may involve, for example, a vehicle identification, by which the mobile radio end device is enabled to establish a communication link to the respective vehicle. The vehicle-specific communication link data may involve, for example, a mobile phone number, via which the particularly selected vehicle can be contacted or the like.

Through in particular manual shifting of the mark to the vehicle symbol on the output unit, the user can simultaneously make a selection at several available vehicles. Of course, more than one vehicle can be selected. This is followed by a transmission of the marked position identifying position data to the navigation device of the particularly selected vehicle. Preferably, it is provided that the mobile radio end device is at least temporarily in communication with the vehicle. The communication link is preferably a wireless connection, which can be designed, for example, with the use of electromagnetic waves, in particular radio, infrared or the like, but also by ultrasound or similar transmission media. The communication link may use a protocol, such as WLAN, Bluetooth™, ZigBee™ or the like. In addition, it can also be provided that the mobile radio end device is in line communication to the navigation device of the vehicle, for example via a wired interface port such as RS232, USB or the like.

Preferably, shifting of the mark triggers an automatic transmission of the position data. Even when the method preferably provides for bi-directional communication, in particular, when a used protocol requires it, the method can also be carried out via unidirectional communication according to the principle of radio broadcasting. In this case, only the position data identifying position data are transmitted to the navigation device of the vehicle. After the transmission, the communication link can be released for other purposes. There is no acknowledge message in this case.

Thus, the invention makes it possible to enter position data in the navigation device of the vehicle in a simple manner.

According to a further configuration, provision is made for a communication link to the vehicle before the step of transmitting. For example, the creation of the communication link to the vehicle can be triggered automatically by the step of shifting of the mark. The communication link may, preferably, be limited to a time period, required for the transmission of the position data. In this way, energy and/or communication channel capacity can be saved.

Moreover, the shifting of the mark can effect the automatic creation of a communication link to the vehicle, taking into account the vehicle-specific communication link data The automatic creation is then implemented under consideration of vehicle-specific communication link data of the vehicle, which, for example, is selected by the step of shifting the mark or symbol. For example, it can be provided that the mobile radio end device dials a mobile phone number of the vehicle to establish the communication link, in addition, it can, of course, also be provided that the mobile radio end device creates a short distance radio link, for example based on the MILAN standard or the like, to the vehicle, which is selected by the shifting the mark.

Overall, it can, of course, also be provided that the shifting of the mark is implemented not only to a vehicle on the output unit, but to several or all vehicles, which are displayed by symbols on the output unit. This allows to provide navigation devices of several vehicles simultaneously with the desired position data.

According to a further configuration, it can be provided that the display of the graphical representation of the vehicle includes a vehicle identification information. The vehicle identification information can be, for example, a license plate of the vehicle, a vehicle owner, combinations thereof and/or the like. In this way, it is possible, in particular when several vehicles are selectable, to specifically select one or more vehicles in a simple manner and to provide them with the desired position data.

According to a further configuration, an input and output unit can be used as an output unit and the marking can be realized by manual operation at a position and/or shifting by manual operation from the position to the displayed vehicle, or vice versa. This configuration makes ergonomically inputting possible in a particularly simple manner. In particular, this configuration enables the user to execute an actuation, for example, with a finger in an ergonomically favorable manner and with less error-prone marking. Basically, the same applies also for the shifting. The input and output unit may be configured for this purpose as a touch-sensitive screen or the like.

According to a further configuration, symbols can be displayed associating multiple vehicles to one symbol and as vehicle the one is selected whose position is the nearest to the position of the mobile radio end device. This is particularly advantageous, when it is provided that the navigation device of an own vehicle of the user should be provided with the position data via the mobile radio end device. For example, the user can provide his navigation device with the desired position data, when he is not yet in his vehicle. As soon as he reached his car, he can start the ride, without requiring any changes to the settings of the navigation device.

Preferably, a navigation destination is used as position. Of course, several navigation destinations may also be used, with a sequence of navigation destinations being preferably set beforehand. The latter makes it possible to plan a route so that the user, without having to make further entries, is automatically routed in the predefined sequence to the desired navigation destinations.

Another configuration of the invention provides that the step of displaying of positions on the graphical output unit of the mobile radio end device includes displaying a map on the graphical output unit of the mobile radio end device and the step of marking the position includes a marking of the position on the map displayed on the output unit, and displaying a mark on the marked position on the map displayed on the output unit. This configuration proves to be particularly beneficial in terms of ergonomics, since it allows the user to select a position in a simple intuitive way without great effort. In particular, in conjunction with the touch-sensitive screen an exceptionally user-friendly and ergonomic operation is realized. The map can be, for example, a topographic map or the like. Of course, a three-dimensional map display can be provided, which is preferably adjustable with regard to scale and shifting. Because of the marking of the position on the map, the mobile radio end device determines the preferably associated position data which are transmitted to the navigation device of the vehicle. The user, therefore, does not need to execute any detailed input in the form of key entry, so that the input not only becomes faster but also more reliable. It proves to be beneficial, when one or more vehicles are additionally displayed upon marking. The display can be effected by suitable vehicle symbols, which preferably include an identification. The user can now create an association to the desired vehicle symbol by moving the mark generated by marking the position. Alternatively, of course, in a dual way a shifting of the vehicle symbol to the mark can be provided. Subsequently, the position data determined for the position are transmitted from the mobile radio end device to the navigation device of the selected vehicle.

According to a further configuration, it is additionally provided that the navigation device transmits a vehicle position to the mobile radio end device which indicates the vehicle position via the output unit. The display can be effected through coordinate data or the like. It proves to be particularly advantageous, when the display is represented graphically, particularly by using an appropriate symbol on the map. In this way, for example, the information regarding the location of the vehicle can also be delivered to the user.

The invention further proposes a mobile radio end device, which is designed for the input of position data in a navigation device of a vehicle, with the mobile radio end device being constructed to execute the method of the invention. This measure can realize a use, in particular an input support for a navigation device of the vehicle. The user does not need any separate means, but he can use his already existing mobile radio end device for this purpose. The mobile radio end device can be equipped with suitable programs or program segments for this purpose, which allow the execution of the process on a computing device of the mobile radio end device.

BRIEF DESCRIPTION OF THE DRAWING

Further advantages and features become apparent from the following description of an exemplary embodiment. The exemplary embodiment is merely illustrative of the invention and is not intended to be limiting thereof.

The sole FIGURE shows a schematic view of a flowchart for a process sequence of the invention.

DETAILED DESCRIPTION OF PREFERRED EMBODIMENTS

The method is used for inputting a position, in particular a navigation destination, in a navigation device of a vehicle. The process sequence is as follows:

In a step 10, positions are initially displayed on a graphical output unit of a mobile radio end device on a map. Displaying of positions can be provided by presenting the map itself.

In a next step 12, a user marks a position on the output unit, which is configured here as a touch-sensitive screen. For the purpose of marking, the user touches the desired position using one of his fingers. A controller that executed the process detects the user input and provides a corresponding mark in the map displayed by the output unit. At the same time, in a step 14, a graphical representation of a vehicle is displayed on the output unit, for which vehicle the mobile radio end device keeps vehicle-specific communication link data available. In the present configuration, this involves the vehicle of the user, who wants to program the navigation device of the vehicle with a navigation destination.

In a further step 16, the user moves the mark, which is displayed on the output unit, by a corresponding shifting motion on the screen toward the graphical representation of the vehicle, namely the vehicle symbol, which is displayed on the output unit by a corresponding vehicle symbol. In a following step 18, the mobile radio end device transmits the position, identified by the position data, to the navigation device of the vehicle. In this way, the position is available in the navigation device of the vehicle and can be selected as a destination by the user. Of course, it can also be provided that the transmitted position is automatically entered as destination in the navigation device. Once the driver or the user of the vehicle starts his travel, a navigation assistance for the driver via the navigation device can be provided without the need for any further inputs.

The foregoing exemplary embodiments are merely describing the invention and are not limiting thereof. In particular, features and embodiments may, of course, be combined as desired with one another in order to realize other need-based configurations, without departing from the spirit of the invention.

In particular, process-related features can be applied accordingly to device features, and vice versa. Moreover, in a dual manner, it is possible to provide instead of shifting the mark to the vehicle symbol a shifting of the vehicle symbol to the mark.

The exemplary embodiment is merely illustrative of the invention and is not intended to be limiting thereof.

What is claimed is:

1. A method for automatically determining position data in a navigation device of a vehicle, comprising:
    displaying a plurality of positions on a graphical output unit of a mobile radio end device;
    marking a displayed one of the positions by a mark through manual operation on the displayed position, wherein a position data identifies the marked displayed position, with the graphical output unit operable for output and input;
    displaying a graphical representation of a symbol for a vehicle via the output unit, with the vehicle providing vehicle-specific data through a first communication link to the mobile radio end device;
    shifting the mark to the symbol of the vehicle or the symbol of the vehicle to the mark through a manual operation on the output unit;
    establishing a second communication link to the vehicle; and
    transmitting the position data, which identify the marked position, via the second communication link to the navigation device of the vehicle.

2. The method of claim 1, wherein the shifting of the mark causes an automatic creation of the second communication link to the vehicle taking into account the vehicle-specific data.

3. The method of claim 1, wherein the displaying of the symbol of the vehicle includes displaying of a vehicle identification information.

4. The method of claim 1, wherein a plurality of multiple-associated symbols associated with a plurality of vehicles are displayed, and responsive to a manual operation on a multiple-associated symbol a vehicle among the plurality of vehicles associated to the multiple-associated symbol whose location is the nearest to the position of the mobile radio end device is selected.

5. The method of claim 1, wherein a navigation destination is used as the marked displayed position.

6. The method of claim 1, wherein the step of displaying of a plurality of positions on the graphical output unit of the mobile radio end device includes displaying a map on the graphical output unit of the mobile radio end device, and the step of marking the position includes a marking of a position on the map and displaying a mark on the marked position on the map displayed on the output unit.

7. The method of claim 1, wherein the navigation device transmits a position data identifying the geographical location of the vehicle to the mobile radio end device which displays the vehicle position via the output unit.

8. A mobile radio end device constructed to execute a method as set forth in claim 1 for automatically determining position data in a navigation device of a vehicle.

* * * * *